(12) United States Patent
Demo

(10) Patent No.: US 11,541,829 B2
(45) Date of Patent: Jan. 3, 2023

(54) ACOUSTICAL BAFFLE

(71) Applicant: FREUDENBERG PERFORMANCE MATERIALS LP, Durham, NC (US)

(72) Inventor: Michael P. Demo, Macomb, MI (US)

(73) Assignee: FREUDENBERG PERFORMANCE MATERIALS LP, Durham, NC (US)

(*) Notice: Subject to any disclaimer, the term of this patent is extended or adjusted under 35 U.S.C. 154(b) by 226 days.

(21) Appl. No.: 16/905,494

(22) Filed: Jun. 18, 2020

(65) Prior Publication Data

US 2021/0394691 A1    Dec. 23, 2021

(51) Int. Cl.
*B60R 13/00* (2006.01)
*B29C 65/00* (2006.01)
(Continued)

(52) U.S. Cl.
CPC .......... *B60R 13/0815* (2013.01); *B29C 65/02* (2013.01); *B29C 70/026* (2013.01); *B32B 5/022* (2013.01); *B32B 5/06* (2013.01); *B32B 5/18* (2013.01); *B32B 5/245* (2013.01); *B32B 5/26* (2013.01); *B32B 17/02* (2013.01); *B32B 17/066* (2013.01); *B32B 17/067* (2013.01);
(Continued)

(58) Field of Classification Search
CPC ....... B60R 13/00; B60R 13/08; B60R 13/081; B60R 13/0815; B29C 65/00; B29C 65/02; B29C 70/00; B29C 70/02; B29C 70/026; B32B 5/00; B32B 5/02; B32B 5/022; B32B 5/06; B32B 5/10; B32B 5/18; B32B 5/20; B32B 5/24; B32B 5/245; B32B 5/26; B32B 517/00; B32B 517/02; B32B 517/06; B32B 517/066; B32B 517/067; B32B 537/00; B32B 537/06; B32B 537/10; B32B 537/18; B32B 537/182; B32B 538/00; B32B 538/08
See application file for complete search history.

(56) References Cited

U.S. PATENT DOCUMENTS 5,899,785 A    5/1999   Groten et al.
5,970,583 A   10/1999   Groten et al.
(Continued)

FOREIGN PATENT DOCUMENTS

EP    1851092    6/2012
EP    2573243    3/2013
(Continued)

OTHER PUBLICATIONS

Camlibel Polyester Production, Characterization and Innovative Applications, Mar. 14, 2018 Abstract attached, full publication found here: https://books.google.com/books?id=6aajAgAAQBAJ&pg=PA69&lpg=PA69&dq=evolon+headliner&source=bl&ots=0wSioZtRCx&sig=ACfU3U1g5F4ZQwc8JHP5XHI40hYEkr0_eQ&hl=en&sa=X&ved=2ahUKEwjGxMjAmo7oAhWKKs0KHdSRD5YQ6AEwBHoECAgQAQ#v=onepage&q=evolon%20headliner&f=false.
(Continued)

*Primary Examiner* — Jacob T Minskey
*Assistant Examiner* — Matthew Hoover
(74) *Attorney, Agent, or Firm* — Grossman, Tucker, Perreault & Pfleger, PLLC

(57) ABSTRACT

The present invention is directed to an acoustical baffle that has use in vehicle interiors, such as an interior headliner. In particular, the baffle can provide improved acoustics while maintaining a desired airflow resistance and can be configured to provide for different sound attenuation characteristics at selected locations of the baffle construction.

11 Claims, 5 Drawing Sheets

(51) Int. Cl.
    B29C 70/00    (2006.01)
    B32B 5/00    (2006.01)
    B32B 17/00    (2006.01)
    B32B 37/00    (2006.01)
    B32B 38/00    (2006.01)
    B60R 13/08    (2006.01)
    B32B 5/02    (2006.01)
    B32B 5/06    (2006.01)
    B32B 5/18    (2006.01)
    B32B 5/24    (2006.01)
    B32B 17/02    (2006.01)
    B32B 17/06    (2006.01)
    B32B 5/26    (2006.01)
    B29C 65/02    (2006.01)
    B29C 70/02    (2006.01)
    B32B 37/18    (2006.01)
    B32B 37/06    (2006.01)
    B32B 38/08    (2006.01)
    B29L 31/30    (2006.01)
    B32B 37/12    (2006.01)
(52) U.S. Cl.
    CPC ............ B32B 37/06 (2013.01); B32B 37/182 (2013.01); B32B 38/08 (2013.01); B29L 2031/3005 (2013.01); B32B 2037/1238 (2013.01); B32B 2305/022 (2013.01); B32B 2305/20 (2013.01); B32B 2307/10 (2013.01); B32B 2307/102 (2013.01); B32B 2307/304 (2013.01); B32B 2307/724 (2013.01); B32B 2309/02 (2013.01); B32B 2309/105 (2013.01); B32B 2315/085 (2013.01)

(56) References Cited

U.S. PATENT DOCUMENTS

| | | | |
|---|---|---|---|
| 7,591,346 B2 | 9/2009 | Thompson, Jr. et al. | |
| 8,016,072 B2* | 9/2011 | Oosting | B60R 13/0225 |
| | | | 181/290 |
| 2003/0104749 A1 | 6/2003 | Emirze et al. | |
| 2009/0117806 A1 | 5/2009 | Kaneda | |
| 2011/0100748 A1* | 5/2011 | Nonogi | G10K 11/172 |
| | | | 181/291 |
| 2011/0285178 A1* | 11/2011 | Li | B60R 13/0212 |
| | | | 296/214 |
| 2020/0055293 A1 | 2/2020 | Ogawa et al. | |
| 2020/0262363 A1 | 8/2020 | Shida et al. | |
| 2021/0115603 A1 | 4/2021 | Prevoteau et al. | |

FOREIGN PATENT DOCUMENTS

| | | |
|---|---|---|
| EP | 2573244 | 3/2013 |
| GB | 358995 | 10/1931 |
| GB | 1514530 | 6/1978 |
| JP | 51-112889 | 10/1976 |
| WO | 2017/141801 | 8/2017 |
| WO | 2019/234334 | 12/2019 |

OTHER PUBLICATIONS

Banerjee, "Rubber Nanocomposites and Nanotextiles", Apr. 26, 2018. Abstract attached, fun publication found here: https://books.google.com/books?id=qFWSDwAAQBAJ&pg=PA219&lpg=PA219&dq=evolon+headliner&source=bl&ots=YVgoA07GrC&sig=ACfU3U2rZxP25JYFkwTYg5EN3bZy5DYcyA&hl=en&sa=X&ved=2ahUKEwjGxMjAmo7oAhWKKs0KHdSRD5YQ6AEwB3oECAkQAQ#v=onepage&q=evolon%20headliner&f=false.

Textile Institute, "Textile Advances in the Automotive Industry", 2008, England. Abstract attached, full publication found here: https://books.google.com/books?id=6aajAgAAQBAJ&pg=PA69&lpg=PA69&dq=evolon+headliner&source=bl&ots=0wSioZtRCx&sig=ACfU3U1g5F4ZQwc8JHP5XHI40hYEkr0_eQ&hl=en&sa=X&ved=2ahUKEwjGxMjAmo7oAhWKKs0KHdSRDSYQ6AEwBHoECAgQAQ#v=onepage&q=evolon%20headliner&f=false.

Kumar, Textiles for Industrial Applications, Apr. 19, 2016. Abstract attached, full publication found here: https://books.google.com/books?id=11nSBQAAQBAJ&pg=PA290&lpg=PA290&dq=evolon+headliner&source=bl&ots=t5EC8ZwKCC&sig=ACfU3U3qdU-kC0t8EYM1xOWYvvOblPIFeg&hl=en&sa=X&ved=2ahUKEwjGxMjAmo7oAhWKKs0KHdSRD5YQ6AEwBXoECAsQA https://books.google.com/books?id=11nSBQAAQBAJ&pg=PA290&lpg=PA290&dl=evonlon=healiner&source=bl&ots=t5EC8ZwKCC&sig=ACfU3U3qdU-kc0t8EYM1xOWYvvOblPlFeg&hl=en&sa=X&ved=2ahUKEwjGxMjAmo7oAhWKKs0KHdSRD5YQ6AEwBXoECAsQAQ#v=onepage&q=evelon%20headliner&f=false.

* cited by examiner ns of 0.20 mm to 0.55 mm at a basis weight of 100 g/m² to 200 g/m²;

ACOUSTICAL BAFFLE

FIELD

The present invention is directed to an acoustical baffle that has use in vehicle interiors, such as an interior headliner. In particular, the baffle can provide improved acoustics while maintaining a desired airflow resistance and can be configured to provide for different sound attenuation characteristics at selected locations of the baffle construction.

BACKGROUND

A variety of multilayer composites are known that are utilized to reduce noise levels in vehicular applications. Specifically, multilayer composites for sound control have been employed in headliners, trunk liners, hood liners, dash mats, interior panels, carpeting and in other vehicular trim panel components to regulate noise reduction in the vehicle interior. Nevertheless, an on-going need exits to improve acoustic performance and airflow resistance and to provide acoustic baffles with reduced complexity of construction and ease of manufacture for vehicular applications.

SUMMARY

A method for forming a multilayer acoustic baffle for a vehicle comprising:

(a) providing the following layered construction:

a coverstock layer having a thickness of 2.0 mm to 7.0 mm;

a spunbond nonwoven layer at a thickness in the range of 0.25 mm to 0.40 mm and a basis weight in the range of 25 g/m² to 40 g/m²;

a first adhesive layer present as particles with an average particle size in the range of 50 µm to 250 µm and at basis weight of 25 g/m² to 55 g/m² at a thickness of 0.1 mm to 0.5 mm;

a first fiberglass layer at a thickness of 0.20 mm to 0.55 mm at a basis weight of 100 g/m² to 200 g/m²;

a polymeric foam layer at a thickness of 4.0 mm to 7.0 mm at a density of 1.2 lbs./ft.³ to 3.6 lbs./ft.³;

a second fiberglass layer at a thickness of 0.20 mm to 0.55 mm at a basis weight of 100 g/m² to 200 g/m²;

a second adhesive layer present as particles with an average particle size in the range of 50 µm to 250 µm and at basis weight of 25 g/m² to 55 g/m² at a thickness of 0.1 mm to 0.5 mm;

a porous bicomponent nonwoven fiber layer at a thickness of 0.25 mm to 0.40 mm having a basis weight of 40 g/m² to 100 g/m² including monofilament fibers present at 0.05 dtex to 2.5 dtex;

(b) heating said layered construction and pressing to form said acoustic baffle having a thickness in the range of 7.0 mm to 15.0 mm and an air permeability in the range of 5000 mks Rayls to 15,000 mks Rayls.

In product form, the present invention is an acoustic baffle for a vehicle comprising:

a coverstock layer formed from a coverstock having a thickness in the range of 2.0 mm to 7.0 mm;

a spunbond nonwoven layer formed form a spunbond nonwoven having a thickness in the range of 0.25 mm to 0.40 mm and a basis weight in the range of 25 g/m² to 40 g/m²;

a first adhesive formed from particles with an average particle size in the range of 50 µm to 250 µm and at basis weight of 25 g/m² to 55 g/m² at a thickness of 0.1 mm to 0.5 mm;

a first fiberglass layer formed from fiberglass at a thickness of 0.20 mm to 0.55 mm at a basis weight of 100 g/m² to 200 g/m²;

a polymeric foam layer formed from a foam having a thickness of 4.0 mm to 7.0 mm and a density of 1.2 lbs./ft.³ to 3.6 lbs./ft.³;

a second fiberglass layer formed from fiberglass at a thickness of 0.20 mm to 0.55 mm at a basis weight of 100 g/m² to 200 g/m²;

a second adhesive formed from particles with an average particle size in the range of 50 µm to 250 µm and at basis weight of 25 g/m² to 55 g/m² at a thickness of 0.1 mm to 0.5 mm;

a porous bicomponent nonwoven fiber layer formed from a porous bicomponet nonwoven at a thickness of 0.25 mm to 0.40 mm having a basis weight of 40 g/m² to 100 g/m² including monofilament fibers present at 0.05 dtex to 2.5 dtex; and wherein the acoustic baffle has a thickness in the range of 7.0 mm to 15.0 mm and an air permeability in the range of 5000 mks Rayls to 15,000 mks Rayls.

DETAILED DESCRIPTION OF PREFERRED EMBODIMENTS

Figure 1:
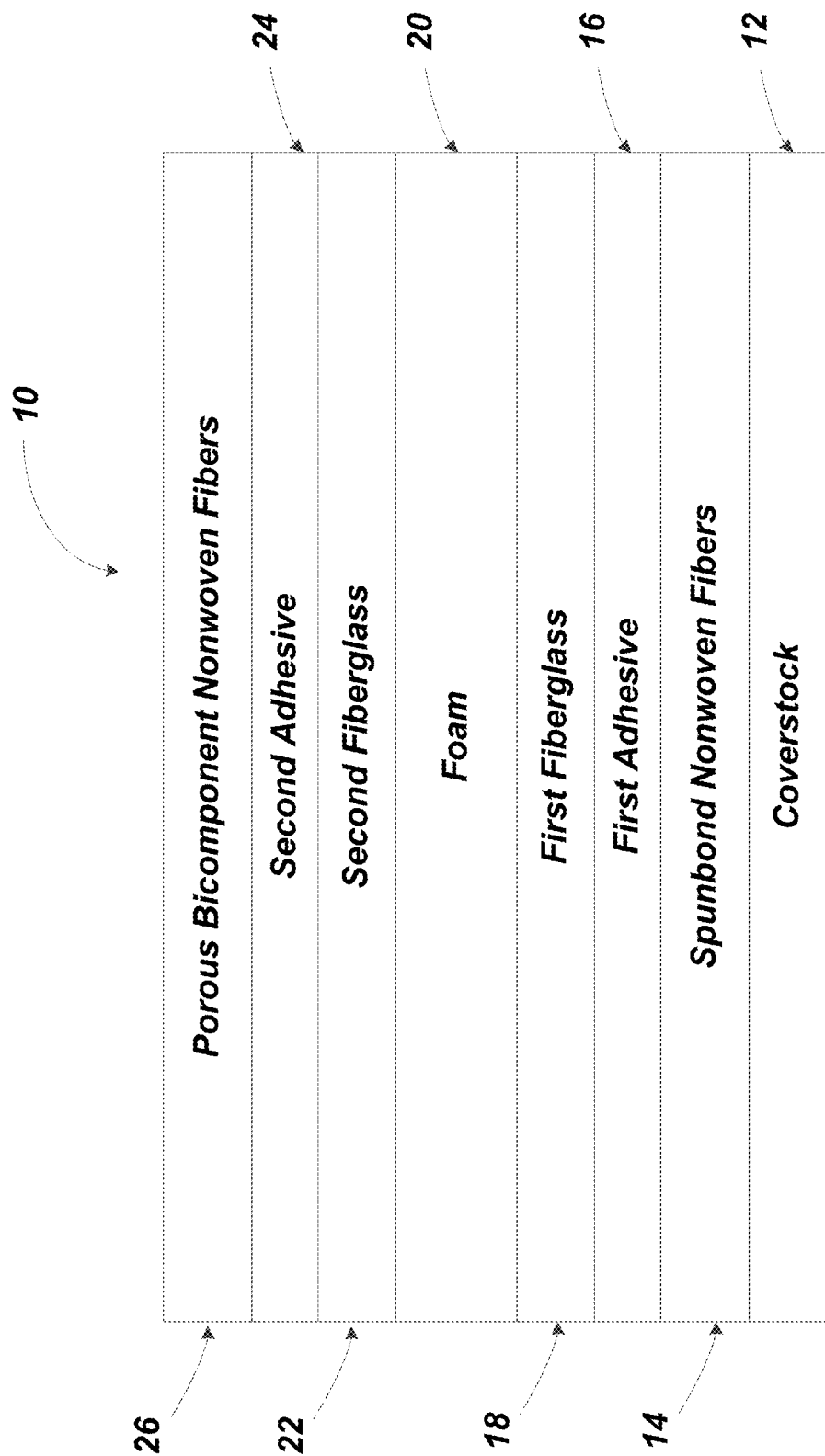
FIG. 1 illustrates a preferred lay-up construction for the formation of an acoustic baffle herein that may be used within a vehicle for sound attenuation.

FIG. 1 illustrates the preferred lay-up construction for the formation of an acoustic baffle 10 herein which may be used within a vehicle where sound attenuation is desired. As illustrated, the lay-up includes a coverstock layer 12 which ultimately presents a fabric or cloth face that is visible to the vehicle occupant. The coverstock preferably has an overall thickness of 2.0 mm to 7.0 mm. The fabric or cloth face of the coverstock itself preferably has a thickness of 0.5 mm to 2.0 mm and the remaining thickness of the coverstock 1.5 mm to 5.0 mm) defines a foam layer.

At 14 one provides a layer of spunbond nonwoven fibers. A spunbond herein may be understood as a nonwoven material made by spinning filament fibers onto a moving surface, such as a moving belt. The spunbond nonwoven herein preferably has a basis weight in the range of 25 g/m² to 40 g/m² at a thickness of 0.25 mm to 0.40 mm. The spunbond nonwoven is preferably sourced from a polyester fiber, such as polyethylene terephthalate (PET). It is contemplated that other thermoplastic polymeric fibers would be suitable, such as fibers sourced from nylons, polypropylene or polyethylene.

At 16 one provides a first adhesive which has a basis weight in the range of 25 g/m² to 55 g/m². The adhesive is preferably in powder form at an average particle size in the range of 50 µm to 250 µm with a melting point (Tm)

preferably in the range of 100° C. to 180° C. The first adhesive is preferably selected from a polyolefin polymer, more preferably polyethylene having a melt flow index (MFI) in the range of 5-20 g/10 minutes according to ASTM D1238. A particularly preferred polyethylene resin is DOW™ DPSA-3170 NT 7 which is identified as a medium density polyethylene resin (MDPE) having a density of 0.937 g/cc that has a MFI of 7.0 g/10 min and a Tm of 125.5° C. As discussed more fully herein the amount and layer thickness of first adhesive 16 is selected such that it serves, upon heating, to join the opposing layers (in this case fiberglass layer 18 and spunbond nonwoven layer 14). In addition, the amount of adhesive employed is such that one selectively avoids forming a non-porous film layer that prevents airflow through baffle 10 at desired locations. Accordingly, one can completely avoid film formation in the baffle or provide for film formation at only selected locations across the baffle cross-section. Accordingly, the thickness of the first adhesive 16 is preferably in the range of 0.1 mm to 0.5 mm.

As alluded to above, the acoustic baffle lay-up next includes a first fiberglass layer 18 at a thickness of 0.20 mm to 0.55 mm at a basis weight of 100 g/m² to 200 g/m². The fiberglass may have a filament diameter in the range of 5 μm to 20 μm. This is followed by a polymeric foam layer 20 having a thickness of 4.0 mm to 7.0 mm having a density of 1.2 lbs./ft.³ to 3.6 lbs./ft.³. Such foam layer may preferably be selected from a polyurethane. This is then followed by a second fiberglass layer 22 also at a thickness of 0.20 mm to 0.55 mm, a basis weight of 100 g/m² to 200 g/m² and with a filament diameter in the range of 5.0 μm to 20.0 μm. The first and second fiberglass layers may preferably be sourced from Jushi Group Co. Ltd. (China) under the designation 440A, which has a filament diameter of 13 μm. This is then followed by a second adhesive layer 24 that is also is in powder form at a basis weight in the range of 25 g/m² to 55 g/m² at an average particle size in the range of 50 μm to 250 μm with a melting point (Tm) preferably in the range of 100° C. to 140° C. The second adhesive is also preferably selected from a polyolefin polymer, more preferably polyethylene having a melt flow index (MFI) in the range of 5-20 g/10 minutes according to ASTM D1238. The second adhesive also is preferably a polyethylene resin, and again, preferably DOW™ DPSA-3170 NT 7 noted above. The second adhesive layer serves, upon heating, to join the opposing layers (in this case fiberglass layer 22 and porous bicomponent nonwoven fibers 26). Similar to the first adhesive 16, the amount of adhesive employed is such that one again selectively avoids forming a non-porous film that prevents airflow through baffle 10 at desired locations. Accordingly, one can completely avoid film formation of second adhesive 24 in the baffle or provide for film formation only at selected locations across the baffle cross-section. Accordingly, the thickness of the second adhesive 24 is preferably in the range of 0.1 mm to 0.5 mm.

The acoustical baffle 10 then includes an uppermost layer 26 that is porous and comprised of bicomponent non-woven (spun bond) fibers. Reference to bicomponent means that two different polymers are present. The fibers are also present in the form of monofilaments at a 0.05 dtex to 2.5 dtex. The bicomponent fibers of layer 26 preferably have a basis weight of 40 g/m² to 100 g/m² and are preferably present at a thickness of 0.25 mm to 0.40 mm. The polymers that may be present include nylon (polyamide), polyester or polypropylene. A particular preferred polyester includes PET. The bicomponent non-woven fibers for uppermost layer 26 are preferably sourced from Freudenberg Performance Materials under the name Evolon™. In addition, as can be seen in FIG. 1, the acoustic baffle 10 avoids the need for any placement of acoustical pads or padding above all or a portion of the uppermost layer 26.

The acoustic baffle 10 having the layered construction herein is then itself preferably heated and pressed in a tooling press that is itself not heated. Preferably, the acoustic baffle 10 is itself first heated to a temperature in the range of 360° F. to 420° F. Such heating may also be preferably achieved by radiant heating, via the use of infrared (IR) radiation. The heating and pressing of the mat is, as alluded to above, is such that: (1) the first adhesive impregnates the first fiberglass layer 18 and spunbond nonwoven fibers 14; and (2) the second adhesive impregnates the porous bicomponent nonwoven 26 and second fiberglass layer 22, wherein in either case the adhesive preferably does not form a film within the acoustic baffle cross-section and therein act to reduce or eliminate airflow through the acoustic baffle. Alternatively, one may selectively form a film at only selected locations within the acoustic baffle cross-section, or one may selectively form a film across the entirety of such cross-section. This ability to now control such film formation allows one to acoustically tune the acoustic baffle with respect to lower frequency sound vibration (50 Hz to 400 Hz), as described herein.

The final overall thickness of the acoustic baffle 10 after heating and pressing is preferably in the range of 7.0 mm to 15.0 mm. The acoustic baffle after heating and compressing preferably indicates an air permeability in the range of 5,000 mks Rayls to 15,000 mks Rayls. In addition, it is noted that the porous bicomponent nonwoven fiber layer 26 itself indicated an air permeability of less than or equal to 600 mks Rayls, more preferably in the range of 150 mks Rayls to 600 mks Rayls. Such air permeability may be measured according to ASTM C522 (2009).

The acoustic baffle herein so produced after heating and compressing may then preferably formed into a headliner for a vehicle passenger compartment. When the acoustic baffle is positioned in a vehicle as a headliner, preferably, the acoustic baffle is suspended with an air gap in the range of 3.0 mm to 15.0 mm from the interior surface of the roof panel. Interior surface is reference to the surface that faces the interior vehicular cockpit. The roof panel itself can be made from metal or composite material (polymer resin and fibers).

Figure 2:
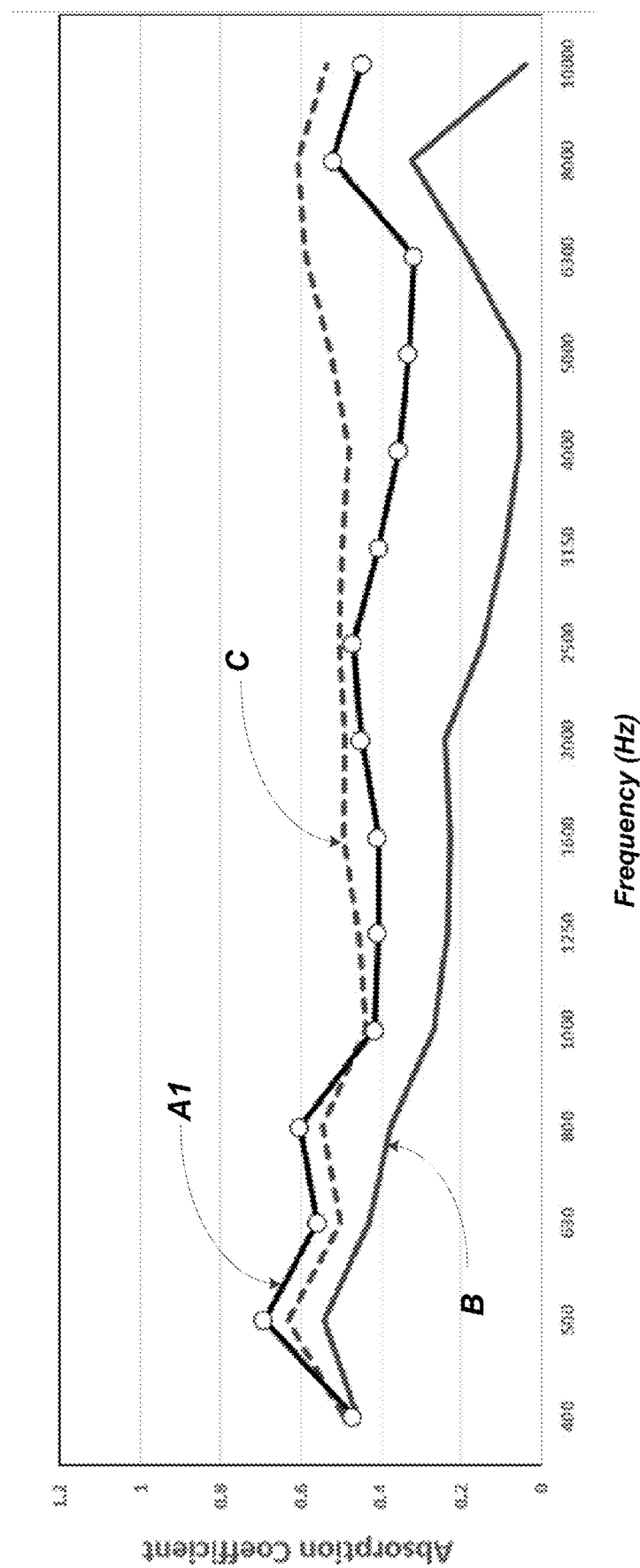
FIG. 2 is a plot of the sound absorption coefficient versus frequency over the range of 400 Hz to 10,000 Hz for the identified samples, pursuant to SAE J2883 (2015).
Figure 3:
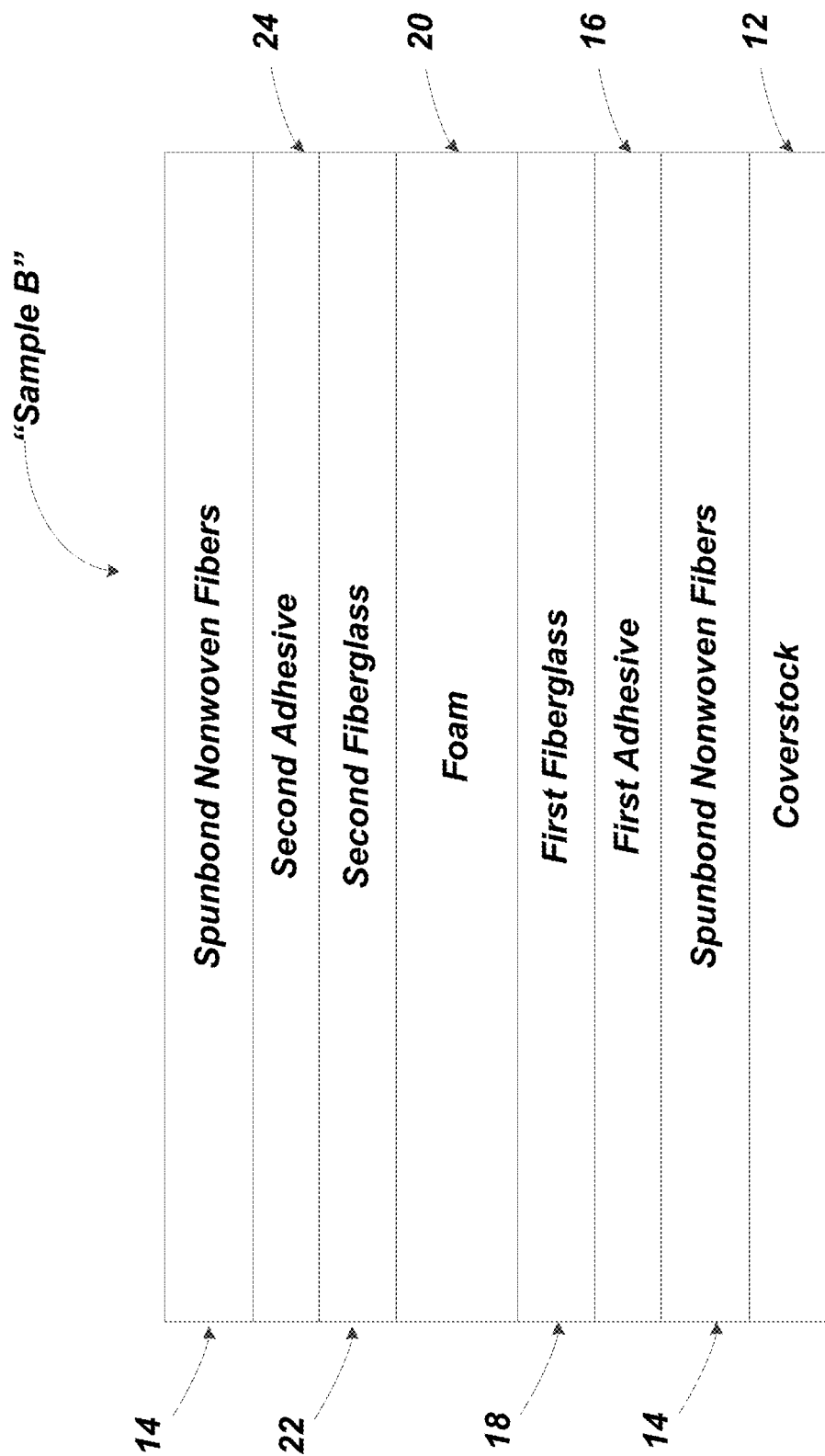
FIG. 3 illustrates the lay-up construction for sample "B" as described herein.

Attention is next directed to FIG. 2 which is a plot of the sound absorption coefficient versus frequency over the range of 400 Hz to 10,000 Hz. The sound absorption coefficient is the ratio of adsorbed sound energy to incident sound energy and higher values therefore indicate relatively more absorbed sound at a given frequency. The sound absorption coefficient is measured according to Society of Automotive Engineers (SAE) test J2883 (2015). Sample "A1" is reference to an acoustic baffle wherein the lay-up is as illustrated and described in FIG. 1, and where the porous bicomponent layer 26 specifically has a basis weight of 100 g/m² and the first adhesive 16 and second adhesive 24 are sourced from a polyethylene having a basis weight of 50 g/m². After heating and compressing this baffle had a thickness of 12.0 mm. Sample "B" is illustrated in FIG. 3 and represents an acoustic baffle with two important differences from Sample "A." As can be seen, the upper and lower nonwoven layers are both the same, namely spunbond nonwoven fiber layers of a single polymeric resin and without the presence of any monofilaments in the range of 0.05 dtex to 2.5 dtex. In addition, the acoustic baffle of sample "B" is one where both the first and second adhesive are present in an amount that leads to the formation of impermeable film layers in the molded baffle product. The molded baffle product of sample "B" had a thickness of 13.0 mm.

As can be observed, as between sample "A1" and sample "B", the acoustic baffle of sample "A1" provided a higher sound absorption coefficient over the entire frequency range of 400 Hz to 10,000 Hz. In particular, the sound absorption coefficient for the acoustic baffle described above in connection with FIG. 1, and as represented by sample "A1" in FIG. 2, falls in the range of 0.45 to 0.70 over the frequency range of 400 Hz to 10,000 Hz.

It is next noted that sample "C" in FIG. 1 represents the lay-up of sample "B", where again, the two adhesive layers are present as barrier film layers in the heated and compressed product. For further comparison purposes, sample "C" also includes the placement of acoustical pads above the upper spunbond nonwoven fiber layer. The acoustical pads were present on about 40% of the surface of the upper spunbond nonwoven fiber layer and at a thickness in the range of 10.0 mm. It is worth noting that acoustic pads are comprises of a melt blown non-woven and are made of polypropylene. As can be seen in FIG. 2, sample "A1" herein provided an improved sound absorption coefficient as compared to sample "C" at a frequency range of 500 Hz to about 1000 Hz.

Figure 4:
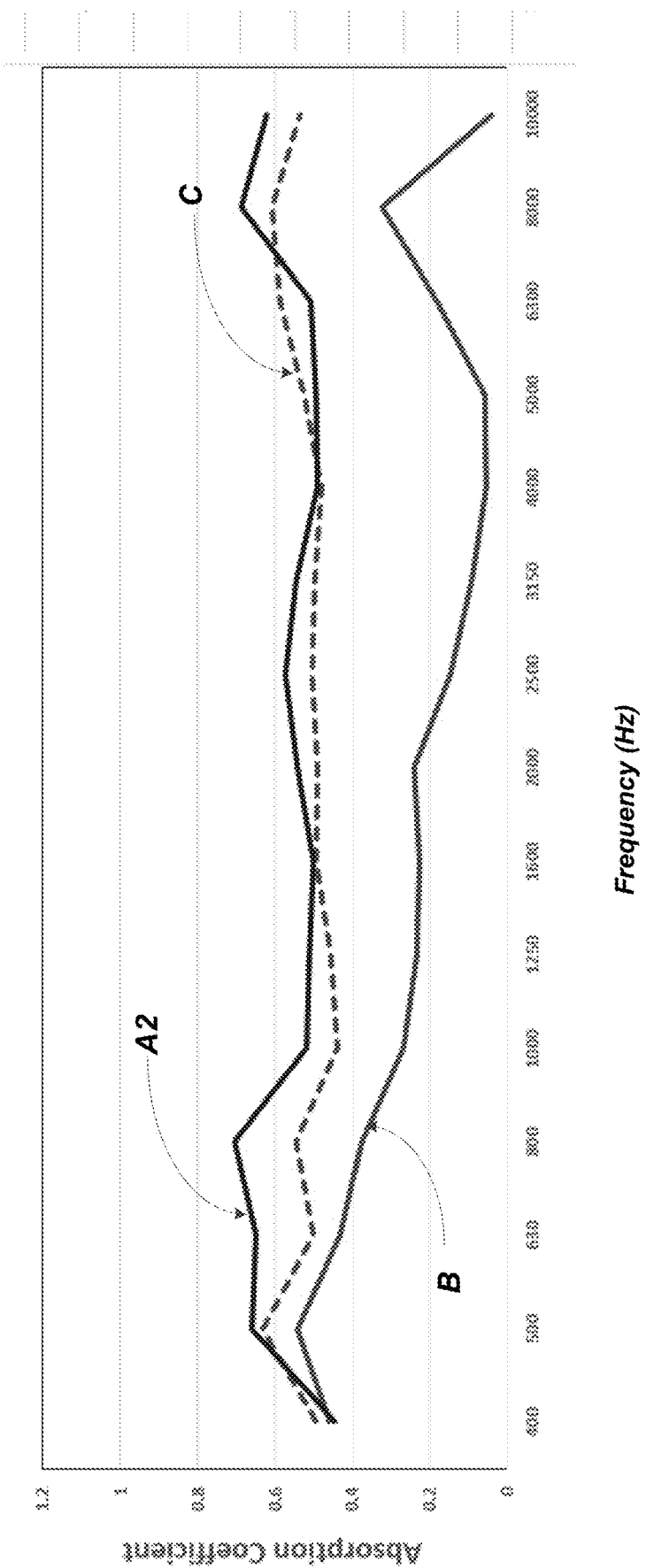
FIG. 4 is a plot of the sound absorption coefficient versus frequency over the range of 400 Hz to 10,000 Hz for the identified samples, pursuant to SAE J2883 (2015).

FIG. 4 provides another plot of the sound absorption coefficient versus frequency over the range of 400 Hz to 10,000 Hz. In FIG. 4 sample "A2" is reference to an acoustic baffle wherein the lay-up is as illustrated and described in FIG. 1 and where the porous bicomponent layer 26 specifically has a basis weight of 80 g/m$^2$ and the first adhesive 16 and second adhesive 24 are sourced from a polyethylene having a basis weight of 50 g/m$^2$. After heating and compressing this baffle had a thickness of 10.0 mm. Samples "B" and "C" are as described above. As can be observed, as between sample "A2" and sample "B", the acoustic baffle of sample "A2" provided a higher sound absorption coefficient over the entire frequency range of 400 Hz to 10,000 Hz. In particular, the sound absorption coefficient for the acoustic baffle described above in connection with FIG. 1, and as represented by sample "A2" in FIG. 4, again falls in the range of 0.45 to 0.70 over the frequency range of 400 Hz to 10,000 Hz. In addition, sample "A2" provided an improved sound absorption coefficient as compared to sample "C" at a frequency range of 500 Hz to 4000 Hz.

Figure 5:
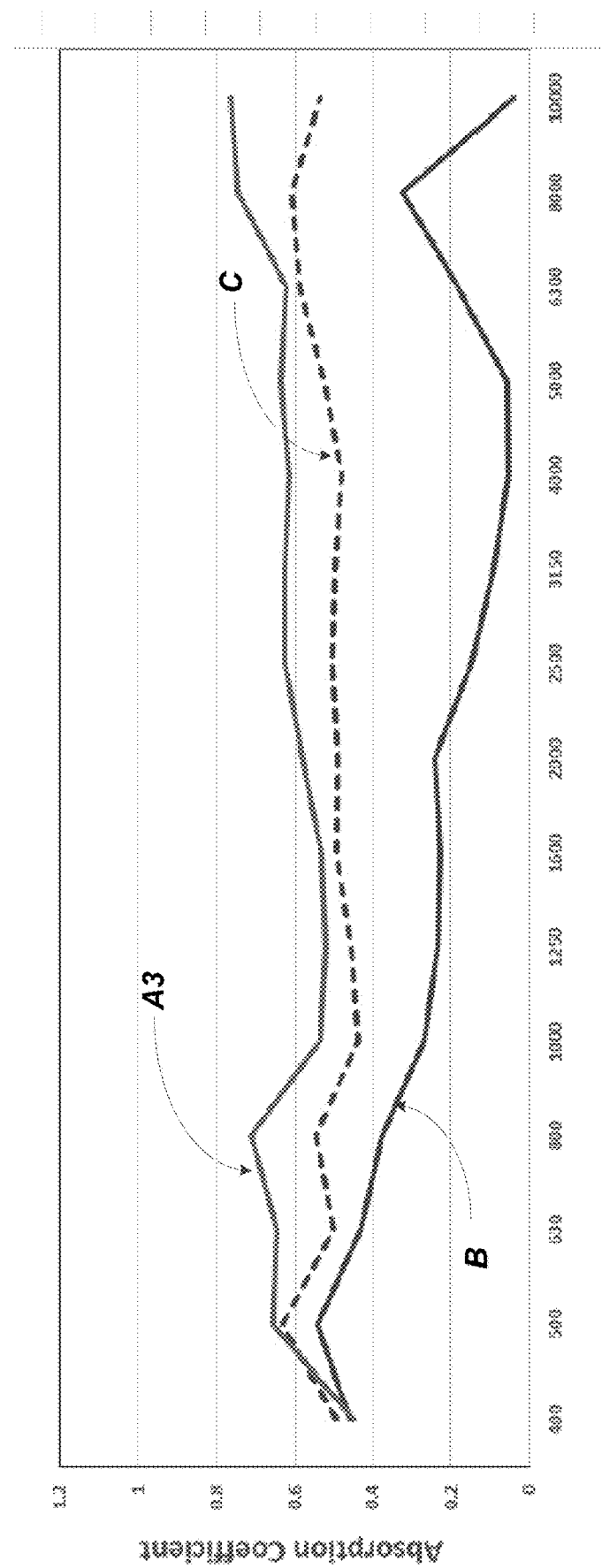
FIG. 5 is a plot of the sound absorption coefficient versus frequency over the range of 400 Hz to 10,000 Hz for the identified samples, pursuant to SAE J2883 (2015).

FIG. 5 provides yet another plot of the sound absorption coefficient versus frequency over the range of 400 Hz to 10,000 Hz. In FIG. 5 sample "A3" is reference to an acoustic baffle wherein the lay-up is as illustrated and described in FIG. 1 and where the porous bicomponent layer 26 specifically has a basis weight of 60 g/m$^2$ and the first adhesive 16 and second adhesive 24 are sourced from a polyethylene having a basis weight of 50 g/m$^2$. After heating and compressing this baffle had a thickness of 12.0 mm. Samples "B" and "C" are as described above. As can be observed, as between sample "A3" and sample "B", the acoustic baffle of sample "A3" provided a higher sound absorption coefficient over the entire frequency range of 400 Hz to 10,000 Hz. In particular, the sound absorption coefficient for the acoustic baffle described above in connection with FIG. 1, and as represented by sample "A3" in FIG. 5, falls in the range of 0.45 to 0.80 over the frequency range of 400 Hz to 10,000 Hz. In addition, sample "A3" provided an improved sound absorption coefficient as compared to sample C at a frequency range of 500 Hz to 10,000 Hz.

As may therefore be appreciated from all of the above, the acoustic baffle of the present invention provides a construction that eliminates the need of acoustical padding on the uppermost surface, where such acoustical padding is present on all or a portion of an upper non-woven surface. Such acoustical padding, as noted, is typically a melt blown nonwoven made of polypropylene and is typically present a thickness in the range of 5.0 mm to 15.0 mm. The present acoustic baffle provides comparative or improved sound absorption coefficients over the range 400 Hz to 10,000 Hz, without the need for an acoustic pad on all or a portion of the acoustic baffle upper surface. The acoustic baffle herein also relies upon the use of an upper porous bicomponent nonwoven layer as herein described and the use of first and second adhesive applied as powder to the lay-up, and where the adhesive is configured so that it will preferably not form a film layer at selected locations in the baffle or across the entire cross-section of the baffle.

It can now also be appreciated that the acoustic baffle 10 herein may be configured such that it can provide different sound absorption characteristics as different location in the vehicle, as one proceeds fore-aft in the vehicle and when the acoustic baffle is applied as a headliner. For example, one may now adjust in the baffle running fore/aft in the vehicle the presence of film formation by adhesive layers 16 and/or 24 over all or a portion of the baffle cross section. It should be noted that one may therefore selectively provide that the amount of adhesive present results in film formation at a desired location or locations, as film formation is contemplated to more specifically provide for improved acoustical performance, at the relatively lower frequencies of 50 Hz to 400 Hz.

While embodiments have been described in detail herein, it should be appreciated that such embodiments are exemplary of the invention and the present invention is not limited to such embodiments. Modifications of the invention will also occur to those of skill in the art who review the specification and figures herein and proceed to then make or use the acoustic baffle invention herein.

What is claimed is:
1. A method for forming a multilayer acoustic baffle for a vehicle comprising:
 (a) providing the following lay-up:
  a coverstock layer having a thickness of 2.0 mm to 7.0 mm;
  a spunbond nonwoven layer at a thickness in the range of 0.25 mm to 0.40 mm and a basis weight in the range of 25 g/m$^2$ to 40 g/m$^2$;
  a first adhesive layer present as particles with an average particle size in the range of 50 μm to 250 μm and at basis weight of 25 g/m$^2$ to 55 g/m$^2$ at a thickness of 0.1 mm to 0.5 mm;
  a first fiberglass layer at a thickness of 0.20 mm to 0.55 mm at a basis weight of 100 g/m$^2$ to 200 g/m$^2$;
  a polymeric foam layer at a thickness of 4.0 mm to 7.0 mm at a density of 1.2 lbs./ft.$^3$ to 3.6 lbs./ft.$^3$;
  a second fiberglass layer at a thickness of 0.20 mm to 0.55 mm at a basis weight of 100 g/m$^2$ to 200 g/m$^2$;
  a second adhesive layer present as particles with an average particle size in the range of 50 μm to 250 μm and at basis weight of 25 g/m$^2$ to 55 g/m$^2$ at a thickness of 0.1 mm to 0.5 mm;
  a porous bicomponent nonwoven fiber layer at a thickness of 0.25 mm to 0.40 mm having a basis weight of 40 g/m$^2$ to 100 g/m$^2$ including monofilament fibers present at 0.05 dtex to 2.5 dtex;
 (b) heating said layered construction and pressing to form said acoustic baffle having a thickness in the range of

7.0 mm to 15.0 mm and an air permeability in the range of 5000 mks Rayls to 15,000 mks Rayls.

2. The method of claim 1 wherein said porous bicomponent nonwoven fiber layer has an air permeability of less than or equal to 600 mks Rayls.

3. The method of claim 1 where said layered construction is heated to a temperature in the range of 360° F. to 420° F.

4. The method of claim 1 wherein upon heating and pressing, said first adhesive impregnates the first fiberglass layer and spunbond nonwoven fiber layer.

5. The method of claim 1 wherein upon heating and pressing, said second adhesive impregnates said porous bicomponent nonwoven and said second fiberglass layer.

6. The method of claim 4 wherein said adhesive does not form a film that restricts airflow in said acoustic baffle.

7. The method of claim 5 wherein said adhesive does not form a film that restricts airflow in said acoustic baffle.

8. The method of claim 1 wherein said first and second adhesive have a melting point in the range of 100° C. to 140° C. and have a melt flow index of 5-20 g/10 minutes.

9. The method of claim 1 wherein said first and second fiberglass layers have filaments with a diameter in the range of 5.0 μm to 20.0 μm.

10. The method of claim 1 wherein said acoustic baffle is positioned as a headliner in a vehicle having a roof panel interior surface and said acoustic baffle is spaced from said roof panel interior surface at a distance of 3.0 mm to 15.0 mm.

11. The method of claim 1 wherein said acoustic baffle has a sound absorption coefficient in the range of 0.45 to 0.80 over the frequency range of 400 Hz to 10,000 Hz.

\* \* \* \* \*